United States Patent Office 3,780,176
Patented Dec. 18, 1973

3,780,176
PREDOMINANTLY AQUEOUS SUBSTITUTED
TRIAMCINOLONE COMPOSITIONS
Fu-Dah Young, River Edge, N.J., assignor to American
Cyanamid Company, Stamford, Conn.
No Drawing. Filed Oct. 5, 1971, Ser. No. 186,789
Int. Cl. A61k 17/00
U.S. Cl. 424—239  7 Claims

ABSTRACT OF THE DISCLOSURE

Aqueous solutions and gels of triamcinolone type steroids, in particular triamcinolone acetonide, are disclosed which are suitable for eye-ear treatment or as topical preparations in gel form.

DESCRIPTION OF THE INVENTION

This invention is concerned with a new and useful composition of matter. In particular, this invention relates to clear aqueous solutions of steroids, gelled topical steroid compositions and methods for their preparation.

The pharmaceutical industry has long been aware of the desirability of having clear aqueous solutions of steroids as well as solutions of steroids and antibacterial agents particularly for eye-ear administration. Heretofore many attempts to prepare such solutions proved futile or at best inadequate, in that insoluble particles of steroids caused irritation. Ointments for use in the eyes, containing steroids affected vision as well as causing irritation due to the hydrophobic nature of the vehicle. A hydrophobic film is formed on the eye surface. The substantially aqueous or physiologically isotonic environment of the eye is therefore a barrier to steroid medication with the usual ointments.

In accordance with the present invention, a steroid such as, for example, triamcinolone acetonide, triamcinolone diacetate, triamcinolone acetonide 21-hemisuccinate, triamcinolone hexacetonide or triamcinolone 16-acetate-21-valerate is solubilized in water to form a crystal clear substantially aqueous solution. These clear aqueous preparations contain as essential ingredients, (1) a steroid in from .03 to 1.0% preferably in a concentration of from 0.05% to 0.15% by weight, (2) an acetylated-ethoxylated ester-ether, derived from cholesterols originating from wool fat (also described as liquid polyoxyethylene derivatives of lanolin) (e.g., Solulan® 98, American Cholesterol Products, Inc., Edison, N.J.) in a concentration of from 10.0% to 40.0% preferably 15% to 25% by weight, and (3) a hypoallergenic liquid fraction of acetylated cholesterols originating from wool fat (also described as a water-thin liquid fraction of acetylated lanolin alcohols), (e.g., Acetulan®, American Cholesterol Products, Inc., Edison, N.J.) in a concentration of from 0.20% to 2% preferably from 0.50% to 1.50% by weight.

The process of the present invention comprises forming a mixture of the steroid with nonionic, non-irritating and nonsensitizing Solulan® 98 and Acetulan® in sufficient quantity to provide the aforesaid percentages by weight and heating the mixture to a temperature of from 65° C. to 90° C. preferably about 75° C. with mild agitation. When the steroid is solubilized to a clear solution, the appropriate amount of water, preheated to the above indicated temperature is added in a thin stream under high agitation. The solution, which is cloudy at this point, is removed from the steam bath and cooled to room temperature (about 25° C.) with constant high agitation. At room temperature, the solution remains stable and crystal clear.

These clear substantially aqueous solutions of steroids are hydrophilic and form a clear, aqueous film on the eye surface, thus providing rapid steroid delivery to the desired site of action.

Crystal clear gel preparations, suitable for topical administration, may be prepared by a procedure similar to that described above for the clear solution, with the modification that Polysorbate 80 (polyoxyethylene sorbitan monooleate) is added to the formulation at a concentration of from about 5.50% to 10.50% by weight, and that in the process of cooling the final preparation from about 65° C. to 90° C. to room temperature (about 25° C.), agitation is stopped when the temperature reaches about 34° C. Gelling begins at about 32° C. and at room temperature the product is a crystal clear, slightly yellowish gel.

It will be obvious that other ingredients such as antibacterials (e.g., neomycin) may be incorporated into the formulations of these clear solutions and gels provided they are, (1) compatible with the other ingredients and (2) pharmaceutically acceptable. The scope of this invention is also intended to include such other ophthalmic preparations containing as a therapeutic component atropine, pilocarpine, pentocaine, etc. Minor amounts of other compounds such as sorbic acid, chemoderm, zinc pyrithione (zinc Omadine®, zinc chelation complex of 1-hydroxypyridine-2-thione) or Vancide® 89 RE (N-trichloromethylthio-4-cyclohexene-1,2-dicarboximide), etc. may be present to give better stability or odor.

In summation, the clear aqueous solutions of steroids are hydrophilic and are compatible with the aqueous lachrymal conditions when tonicity and pH are adjusted. Most significantly, the clear substantially aqueous solutions will allow rapid steroid absorption by the eye and/or ear and will therefore be more effective since the steroid will exist in the molecular or solubilized state.

An ophthalmic solution made in accordance with this invention and containing 0.1% triamcinolone acetonide and 0.35% neomycin sulfate passes the rabbit eye test as described by F.D.A. Rules and Regulations (Title 21, 191.12) for eye-irritants. It was found also that the placebo of this solution passed the rabbit eye test.

SPECIFIC DESCRIPTION

The following examples describe representative formulations of the present invention. Quantities or parts are by weight unless otherwise indicated.

EXAMPLE I

| Ingredient: | Percent w./w. |
|---|---|
| Triamcinolone acetonide | 0.105 |
| Neomycin sulfate | [1] 0.385 |
| Solulan® 98 | 17.00 |
| Acetulan® | 0.85 |
| Sodium chloride (q.s. to isotonicity) | 0.54 |
| Sodium hydroxide (q.s. to pH 7.4). | |
| Water for injection | Q.s. to 100.00 |

[1] As base.

The 105 mg. portion of triamcinolone acetonide, 0.85 g. of Acetulan® and 17.0 g. of Solulan® 98 are mixed in a 200 ml. beaker. The mixture is placed on a steam bath maintained at 75° C. and is agitated using stirring blades attached to a speed-controlled motor. When the triamcinolone acetonide is completely dissolved, 50.0 g. of water, preheated to about 75° C. is added in a thin stream with vigorous agitation. The mixture is removed from the steam bath but agitation is continued. The neomycin sulfate consisting of 0.385 g. (calculated as neomycin base) and 0.54 g. of sodium chloride are added to the solution. Sufficient water, preheated to about 75° C., to make 100.0 g. of final solution, is added to the mixture. High agitation is maintained as the solution is allowed to cool to room temperature. Drops of 1.0 N sodium hydroxide are added until the pH is about 7.4. An osmometer is used to check the isotonicity at 280 millios-moles. Sterilization is accomplished by filtering through a white, plain filter membrane of 0.22µ pore size. The resulting solution is crystal clear and slightly yellowish.

Following the above procedure and substituting triamcinolone diacetate in place of triamcinolone acetonide, a similar product is obtained.

EXAMPLE II

Preparation of topical gel

| Ingredient: | Percent w./w. |
|---|---|
| Triamcinolone acetonide | 0.105 |
| Acetulan® | 0.85 |
| Solulan® 98 | 34.00 |
| Polyoxyethylene (20) sorbitan monooleate | 8.50 |
| Purified water | Q.s. to 100.00 |

The 0.105 g. of triamcinolone acetonide, 0.85 g. of Acetulan® and 15 g. of Solulan® 98 are mixed in a 200 ml. beaker. The mixture is then placed on a steam bath maintained at about 75° C. and is agitated using constant control stirring blades. When the triamcinolone acetonide is dissolved, 50.0 g. of water, preheated to about 75° C., is added in a thin stream under vigorous agitation conditions, The remaining 19.0 g. of Solulan® 98 and 8.50 of polyoxyethylene (20) sorbitan monooleate are mixed in a 100 ml. beaker on a steam bath maintained at about 75° C. and then poured into the solution contained in the 200 ml. beaker in a thin stream under vigorous agitation conditions at about 75° C. The contents are removed from the steam bath and cooled while maintaining vigorous agitation. The solution at this point is cloudy, white and opaque. At about 34° C. the solution becomes crystal clear and yellowish. Agitation is stopped at about 34° C. and the stirring blades are removed from the solution. At about 32° C. the solution begins to gel. At room temperature (about 25° C.) the preparation is a stable, crystal clear, yellowish gel.

Using the above procedure and substituting triamcinolone acetonide-21-hemisuccinate, triamcinolone hexacetonide or triamcinolone 16-acetate-21-valerate in place of triamcinolone acetonide, a similar product is obtained.

EXAMPLE III

Preparation of gel

| Ingredient: | Percent w./w. |
|---|---|
| Triamcinolone acetonide | 0.105 |
| Sorbic acid food grade | 0.22 |
| Polyoxyethylene (20) sorbitan monooleate | 8.50 |
| Acetulan® | 0.85 |
| Solulan® 98 | 34.00 |
| Chemoderm 840 (Firmenich) | 0.30 |
| Purified water | Q.s. to 100.00 |

The triamcinolone acetonide, Acetulan®, sorbic acid and 15 g. of Solulan® 98 are mixed in a beaker and placed on a steam bath maintained at about 75° C. and stirred continuously. When the triamcinolone acetonide is dissolved, 50.0 g. water, preheated to about 75° C. is added in a thin stream under vigorous agitation. The remaining 19.0 g. of Solulan® 98, 8.50 g. of polyoxyethylene (20) sorbitan monooleate and chemoderm are mixed and heated on steam bath at about 75° C. and then poured into the triamcinolone solution in a thin stream under vigorous agitation at about 75° C. The mixture is removed from steam bath and cooled with vigorous agitation. At about 35° C. the solution becomes clear and slightly yellowish. On further cooling at room temperature (25° C.) the preparation is a crystal clear, yellowish gel.

EXAMPLE IV

Preparation of gel

| Ingredient: | Percent w./w. |
|---|---|
| Triamcinolone acetonide-21-hemisuccinate | 1.05 |
| Zinc complex of 1-hydroxypyridine-2-thione | 2.2 |
| Polyoxyethylene (20) sorbitan monooleate | 85.0 |
| Acetulan® | 8.5 |
| Solulan® 98 | 340.0 |
| Chemoderm 840 (Firmenich) | 3.0 |
| Purified water | Q.s. to 1000.00 |

The triamcinolone acetonide-21-hemisuccinate, Acetulan®, zinc complex of 1-hydroxypyridine-2-thione and 150 g. of Solulan® 98 are mixed in a beaker and placed on a steam bath maintained at about 75° C. and stirred continuously. When the triamcinolone acetonide-21-hemisuccinate is dissolved, 500.0 g. water, preheated to about 75° C. is added in a thin stream under vigorous agitation. The remaining 190.0 g. of Solulan® 98, 85.0 g. of polyoxyethylene (20) sorbitan monoleate and chemoderm are mixed and heated on steam bath at about 75° C. and then poured into the triamcinolone solution in a thin stream under vigorous agitation at about 75° C. The mixture is removed from steam bath and cooled with vigorous agitation. At about 35° C. the solution becomes clear and slightly yellowish. On further cooling at room temperature (25° C.) the preparation is a crystal clear, yellowish gel.

EXAMPLE V

Preparation of gel

| Ingredient: | Percent w./w. |
|---|---|
| Triamcinolone 16-acetate-21-valerate | 0.210 |
| N-trichloromethylthio-4-cyclohexene-1,2-dicarboximide | 0.44 |
| Polyoxyethylene (20) sorbitan monooleate | 17.00 |
| Acetulan® | 1.70 |
| Solulan® 98 | 68.00 |
| Chemoderm 840 (Firmenich) | 0.60 |
| Purifiied water | Q.s. to 200.00 |

The triamcinolone 16-acetate-21-valerate, Acetulan®, N-trichloromethylthio-4-cyclohexene - 1,2 - dicarboximide and 30 g. of Solulan® 98 are mixed in a beaker and placed on a steam bath maintained at about 75° C. and stirred continuously. When the triamcinolone derivative is dissolved, 100.0 g. water, preheated to about 75° C. is added in a thin stream under vigorous agitation. The remaining 38.0 g. of Solulan® 98, 17.0 g. of polyoxyethylene (20) soribtan monooleate and chemoderm are mixed and heated on steam bath at about 75° C. and then poured into the triamcinolone derivative solution in a thin stream under vigorous agitation at about 75° C. The mixture is removed from steam bath and cooled with vigorous agitation. At about 35° C. the solution becomes clear and slightly yellowish. On further cooling at room temperature (25° C.) the preparation is a crystal clear, yellowish gel.

I claim:

1. A clear, substantially colorless, aqueous topical steroid composition consisitng essentially of from .03 to 1.0% by weight of a steroid selected from the group consisting of triamcinolone diacetate, triamcinolone acetonide, triamcinolone acetonide 21-hemisuccinate, triamcinolone hexacetonide, and triamcinolone-16-acetate-21 - valerate, 10% to 40% by weight of an acetylated ethoxylated ester-ether derived from cholesterols obtained from wool fat, 0.20% to 2.0% by weight of a hypoallergenic liquid fraction of acetylated cholesterols obtained from wool fat, 0 to 10.5% by weight of polyoxyethylene sorbitan monooleate, sodium chloride q.s. to isotonicity, sodium hydroxide q.s. to about pH 7.4 and the remainder being predominantly water.

2. A solution in accordance with claim 1, wherein the steroid is triamcinolone acetonide.

3. A solution in accordance with claim 1, wherein the steroid is triamcinolone acetonide 21-hemisuccinate.

4. A solution in accordance with claim 1, wherein the steroid is triamcinolone diacetate.

5. A solution in accordance with claim 1, wherein the steroid is triamcinolone-16-acetate-21-valerate.

6. A solution in accordance with claim 1, containing about 0.1% triamcinolone acetonide, about 17.0% of an acetylated-ethoxylated ester-ether derived from cholesterols obtained from wool fat and about 0.85% of acetylate cholesterols obtained from wool fat.

7. A solution in accordance with claim 1, wherein neomycin sulfate (as base) is present in about 0.385% by weight.

References Cited
UNITED STATES PATENTS

| | | | |
|---|---|---|---|
| 3,210,248 | 10/1965 | Feldmann et al. | 424—240 X |
| 3,472,931 | 10/1969 | Stoughton | 424—240 X |
| 3,180,797 | 4/1965 | Cacchillo et al. | 424—240 X |
| 3,376,193 | 4/1968 | Elks et al. | 424—243 |
| 2,880,130 | 3/1959 | Johnson | 424—240 X |
| 3,352,753 | 11/1967 | Lernor | 424—241 |
| 3,535,427 | 10/1970 | Miller et al. | 424—238 X |
| 3,666,857 | 5/1972 | Russell | 424—240 |
| 2,900,307 | 8/1955 | Wei | 424—240 |

SHEP K. ROSE, Primary Examiner

U.S. Cl. X.R.

424—240